April 19, 1949.  G. A. TINNERMAN ET AL  2,467,604
FASTENENING CONSTRUCTION
Filed Sept. 19, 1946
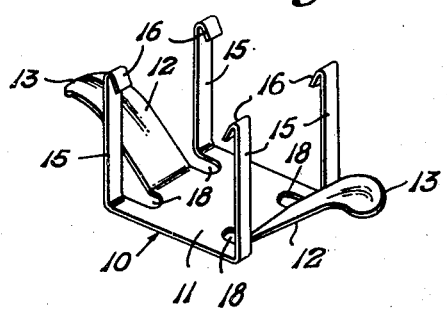
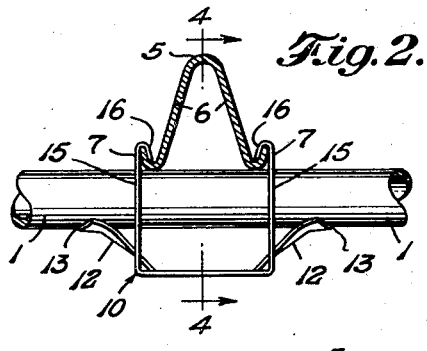
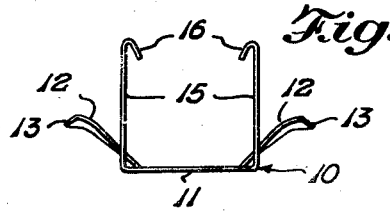
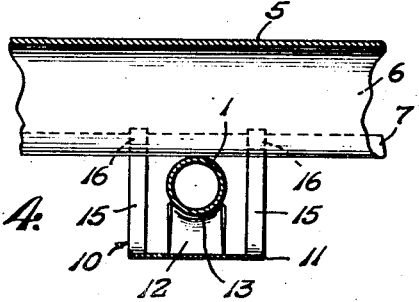
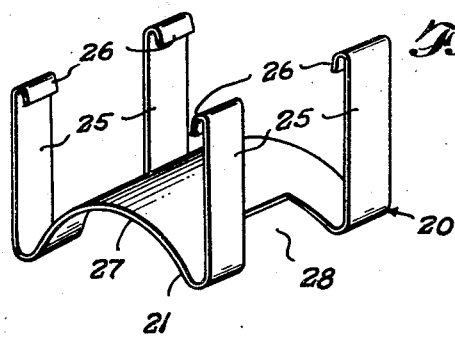
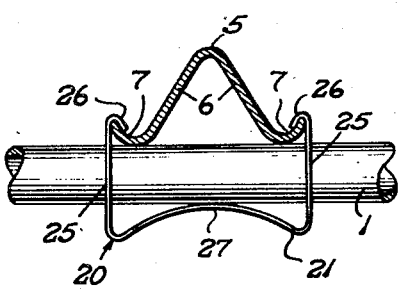
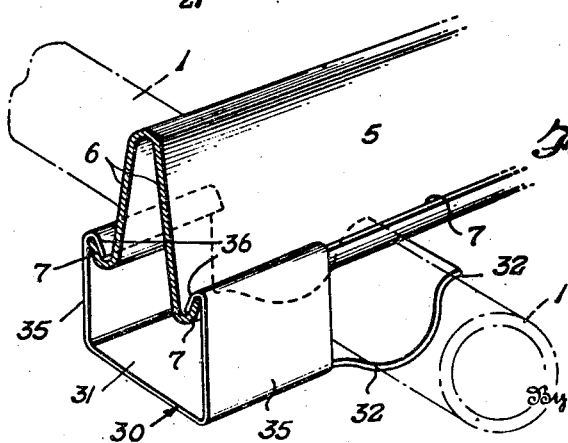
Inventors
George A. Tinnerman
and Laurence H. Flora,
By H. G. Lombard
Attorney Patented Apr. 19, 1949

2,467,604

UNITED STATES PATENT OFFICE 2,467,604

FASTENING CONSTRUCTION

George A. Tinnerman and Laurence H. Flora, Cleveland, Ohio, assignors to Tinnerman Products, Inc., Cleveland, Ohio, a corporation of Ohio Application September 19, 1946, Serial No. 698,052

5 Claims. (Cl. 287—54)

This invention relates in general to improvements in the fabrication of wall or frame structures which are particularly applicable to aircraft and similar constructions and which otherwise have a wide range of uses in the manufacture of various types of lightweight frame structures, and the like.

More particularly, the invention is directed to improvements in the fabrication of wall or frame structures of general utility comprising structural tubing, rods, or the like, associated with complementary, angularly disposed ribs in the form of hat sections or similar extrusions defining a framework such as the fuselage or wing of an aeroplane, for example, and secured by improved, simplified clip fastening devices which are strong and durable, light in weight, and designed to minimize the cost of labor and materials in present day mass production methods of assembly.

A primary object of the invention is to provide an improved fastening means for the fabrication of such wall or frame structures comprising clip fastening devices designed for quick and easy snap fastening action to applied position firmly and rigidly securing the structural elements of a wall or frame structure under continuous spring tension in a manner which prevents any loosening or displacement of the parts secured under extreme conditions of vibration, shock, or the like.

Another object of the invention is for the provision of improved clip fastening means for a wall or frame structure such as described, which are applied to fastening position in a minimum of time and effort and which closely approximate the contour of the parts secured in such fastening position in providing a wall or frame structure having a minimum overall thickness or cross-section.

A further object of the invention is to provide such clip fastening means which secure the structural elements of an installation without in any way weakening the same, as distinguished from other methods of fabrication which require for the application of the fastening means employed, the provision of rivet holes, bolt openings and fastener receiving recesses in the structural parts secured which, of course, weaken such parts and reduce the rated strength thereof. In contrast, by the improved clip fastening means of the present invention, the structural parts are secured without need for any form of fastener receiving recess, and in a manner whereby such parts retain their maximum strength in the installation. This makes possible high efficiency in design inasmuch as a structure may be readily designed to meet certain load requirements and yet be relatively light in weight which, of course, is highly advantageous in aeroplane constructions and the like.

A further more specific object of the invention contemplates various forms of clip fastening devices for the purposes described having simple, inexpensive constructions which are adapted for economical quantity production in that they may be produced at relatively low cost from ordinary sheet metal strip stock with little loss or waste of material.

With the foregoing and other objects in view, further objects and advantages and other new and useful features in the construction, arrangement and general combination of parts of the invention will be readily apparent to those skilled in the art as the following description proceeds with reference to the accompanying drawings, for purposes of illustration but not of limitation, in which like reference characters designate like parts through the same, and in which:

Fig. 1 is a perspective view of one form of the improved clip fastener of the invention;

Fig. 2 is a side elevational view showing the clip fastener of Fig. 1 as applied to a structural rod or tubing and securing thereto a hat section rib element, represented in section;

Fig. 3 is an edge elevational view of the clip fastener shown in Fig. 1; and,

Fig. 4 is a sectional view of Fig. 2, looking in the direction of the arrows;

Fig. 5 is a perspective view of another form of clip fastener of the invention; and, Fig. 6 is a side elevational view similar to Fig. 2 showing the clip of Fig. 5 as applied to secure a structural rod or tubing to a hat section rib, shown in section.

Fig. 7 is a perspective view of an installation similar to Figs. 2 and 6 as secured by another form of clip fastener of the invention.

Referring now, more particularly, to the drawings, it will be understood that the structural member 1, is one of a series of tubes or rods extending in spaced, parallel relation throughout the frame area of a structure. The framework is built up on the series of spaced tubing 1 by means of series of spaced ribs 5 in the form of channel shaped or hat section extrusions extending at right angles and in juxtaposed relation to the series of spaced tubing 1. The ribs 5 are of rigid, generally channel-shaped formation comprising side walls 6 terminating in return bent lateral flanges 7 extending generally upwardly and outwardly in diverging relation. The lateral flanges extend free and form an excellent means for the application of the clip fasteners of the invention to secure the structural tube and rib members of the framework without the use of rivets, bolts, screws or other fasteners that require the provision of recesses in the structural members which, of course, not only weaken the structural members but also involve added time and increased costs for labor and equipment.

With the framework built up by the series of spaced structural tubing 1 and the series of spaced superposed or juxtaposed ribs 5 in right angle relation thereto, as aforesaid, it will be understood that the junction of each tube 1 with a rib or hat section 5 is substantially as shown in Fig. 2. In this relation, the improved clip fasteners of the invention are designed to fasten any such junction of a tubing and rib by clamping these members together under continuously effective spring tension and securing the same rigidly by a positive connection with the lateral flanges 7 of the rib member.

Each form of the clip fastener is a relatively simple inexpensive article of manufacture which is admirably suited for quantity production at very low cost in that it may be provided from standard strip stock with little loss or waste of material. The clips may be formed from any suitable sheet metal preferably of a spring metal nature such as spring tempered metal or cold rolled metal having spring like characteristics, with the size, thickness and finish thereof selected according to service requirements and the predetermined size of the parts secured.

In Figs. 1-4 inclusive, the clip fastener designated generally 10, comprises a central body or base portion 11 having on either end a spring element in the form of a finger 12 bent upwardly out of the plane thereof in outwardly diverging relation. The extremities 13 of said spring fingers are outwardly flared and cupped or channel-shaped to a generally round configuration conforming to the contour of the tubing 1 for snugly engaging the same. The spring fingers 12 in outwardly diverging relation have more or less the same inclination relative to the body 11 so that the cupped extremities 13 are in substantial alignment. On either side of each of said spring fingers 12, arm members 15 are bent generally normal to the body 11 and have their ends bent inwardly to define hooks 16. Preferably, the arms 15 are bent normal to the body 11 at points outwardly of the junctions of the spring fingers 12 with said body and, for increased resiliency in the body of the clip, the arms 15 are spaced laterally from the spring fingers 12 by cutout areas 18.

The clips thus provided are applied as shown in Figs. 2 and 4 to secure each junction of tubing 1 and ribs 5 wherever necessary or desirable in fabricating the framework or wall of required strength and rigidity. The clips are applied with the arms 15 foremost and straddling the tubing 1 in such a way that the channel-shaped extremities 13 of the spring fingers 12 snugly engage the round contour of the tubing 1. Pressure is then exerted normal to the fastener body 11 causing the spring fingers 12 to spread outwardly as the arms 15 are moved axially as necessary for the hooks 16 on said arms to snap beyond the edges of the lateral flanges 7 on the rib 5 and hook onto said flanges in positive connection therewith. Upon release of pressure on the fastener body 11 the spring fingers 12 attempt to assume their initial untensioned position relative to the fastener body and thereby exert a reverse axial pull on the arms 15 to maintain the hooks 16 in positive connection with the rib flanges 7 under constant spring tension. Likewise, the spring fingers 12 press against the tubing under constant spring tension, with the cupped or channel-shaped extremities 13 engaging and seating the tubing 1 as seen in Fig. 4 to prevent any lateral shifting or displacement of the clip from applied fastening position firmly and rigidly securing the tubing 1 and rib 5 in a completed installation.

Figs. 5 and 6 show a further form of the invention in which the clip fastener 20 is generally similar in application and use to that described with reference to Figs. 1-4 inclusive. The body 21 in this form of fastener is inwardly bowed or arched transversely to define a resilient hump 27 between the pairs of arms 25 which are bent generally normal to said body and provided with hooks 26 on the extremities thereof. Preferably cutout areas 28 are provided in said body to increase the flexibility thereof. The fastener is applied substantially as shown in Fig. 6 in a procedure which is generally similar to that of the fastener previously described. The bowed or arched body 21 of the fastener is compressed against the tubing 1 to move the arms 25 axially as necessary for the hooks 26 to snap onto the lateral flanges 7 on the rib 5 in positive connection therewith. When pressure is withdrawn, the bowed body 21 attempts to assume its initial configuration and thereby exerts an axial pull on the arms 25 to maintain said hooks 26 in connection with the lateral flanges 7 of the rib 5 under constant spring tension.

Fig. 7 shows another form of clip fastener and the application thereof in the manner of the previously described embodiments of the invention to secure the junction of the structural tubing 1 with a rib member 5. The fastener 30 comprises a body 31 having arms bent generally normal thereto and provided with hooks 36 on the extremities thereof. The body 31 includes an extension defining a resilient clamping member 32 which is bowed or arched outwardly from the body and approximates the contour of the tubing 1. The resilient clamping member 32 otherwise is so constructed and arranged relative to the attaching arms 35 of the fastener as to require flexing thereof in securing of the parts of the installation. Accordingly, in the application of this form of clip, the resilient clamping member 32 is positioned in engagement with the tubing 1 and pressure exerted on the body 31 to cause said clamping member 32 to flex relative to the body as necessary for the arms 35 to move axially and permit the hooks 36 thereon to snap into positive connection with the lateral flanges 7 on the rib 5. When pressure is removed from the fastener body 31, the clamping member 32 remains in a somewhat flexed condition so that the tubing 1 and rib 5 are secured by the clip fastener under constant spring tension.

Although the invention is described in connection with a wall or frame construction which is particularly useful in aircraft, it is to be understood that the invention is equally adaptable to various other similar applications and uses in building constructions and the like within the broad general scope and basic teachings of the instant disclosure.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable installation adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A construction comprising a structural member in the form of a tubing, rod or the like, a rib member extending in juxtaposed and angular relation to said structural member, and a one-piece fastener securing said structural and rib members at the junction thereof comprising a fastener body having cooperating pairs of spaced arms extending therefrom in the same general direction, each pair of spaced arms having spaced free ends passing said structural member therebetween and interlocked to said rib member, and a resilient element associated with said fastener body engaging said structural member under constant spring tension.

2. A construction comprising a structural member in the form of a tubing, rod or the like, a rib member having lateral flanges and extending in juxtaposed and angular relation to said structural member, and a one-piece fastener securing said structural and rib members at the junction thereof comprising a fastener body having cooperating pairs of spaced arms extending therefrom in the same general direction, each pair of spaced arms having spaced free ends passing said structural member therebetween and interlocked to said flanges on the rib member, and a resilient element associated with said fastener body engaging said structural member under constant spring tension.

3. A construction comprising a structural member in the form of a tubing, rod or the like, a rib member extending in juxtaposed and angular relation to said structural member, and a one-piece fastener securing said structural and rib members at the junction thereof comprising a fastener body having cooperating pairs of spaced arms extending from a face thereof in the same general direction, each pair of spaced arms having spaced free ends passing said structural member therebetween and interlocked to said rib member, and a resilient spring finger between each pair of spaced arms extending from the same face of the fastener body as said arms and engaging said structural member under constant spring tension.

4. A construction comprising a structural member in the form of a tubing, rod or the like, a rib member extending in juxtaposed and angular relation to said structural member, and a one-piece fastener securing said structural and rib members at the junction thereof comprising a fastener body having cooperating pairs of spaced arms extending therefrom in the same general direction, each pair of spaced arms having spaced free ends passing said structural member therebetween and interlocked to said rib member, said fastener body having an arch in the direction in which said arms extend therefrom defining a resilient hump engaging said structural member under constant spring tension.

5. A fastener comprising a sheet metal body having cooperating pairs of arms extending therefrom in generally parallel and spaced relation, the extremities of said arms being bent inwardly toward each other to define hooks for attaching the fastener to one of two parts to be secured in crossed relation, and resilient means associated with the fastener body for resiliently engaging the other of said two parts.

GEORGE A. TINNERMAN.
LAURENCE H. FLORA.

REFERENCES CITED

The following references are of record in the file of this patent:

UNITED STATES PATENTS

| Number | Name | Date |
|---|---|---|
| 705,951 | MacLean | July 29, 1902 |
| 812,053 | Lease | Feb. 6, 1906 |
| 814,092 | Staples | Mar. 6, 1906 |
| 1,454,254 | Roney | May 8, 1923 |
| 1,527,618 | Wright | Feb. 24, 1925 |
| 1,939,223 | Palmer | Dec. 12, 1933 |